Patented Sept. 29, 1931

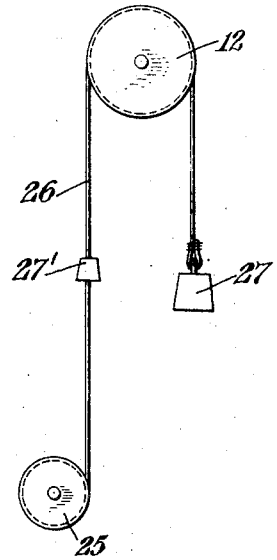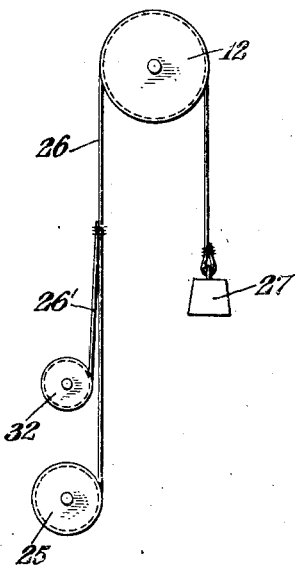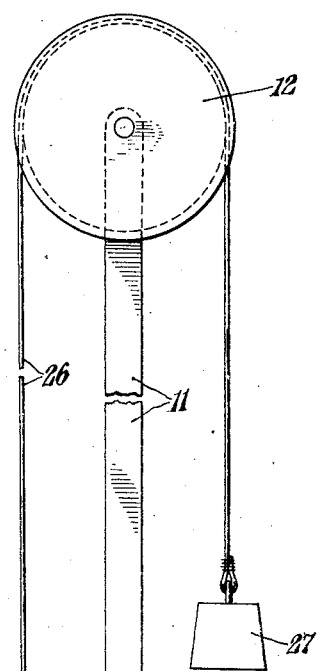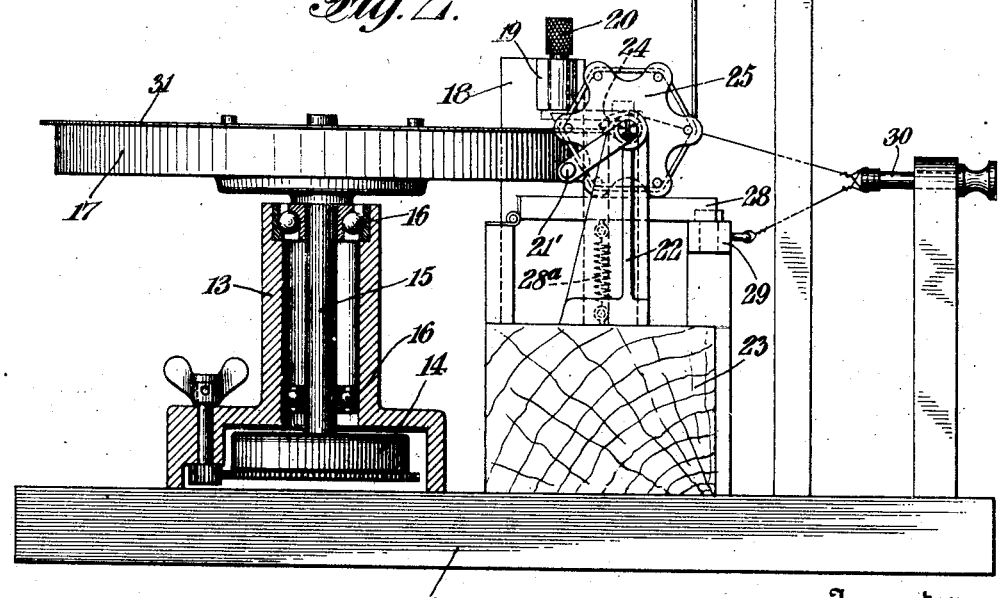

1,825,136

UNITED STATES PATENT OFFICE

PETER L. TEA, OF YONKERS, NEW YORK

APPARATUS FOR INVESTIGATING EXPERIMENTALLY THE LAWS OF MOVING BODIES

Application filed December 20, 1927. Serial No. 241,431.

This invention relates to apparatus for investigating experimentally the laws of moving bodies.

An object of this invention is a simple, inexpensive and efficient apparatus for mechanically producing substantially parallel records of elapsed time and distance traveled by a moving body during the elapsed time.

An apparatus embodying the invention comprises a rotating member, such, for example, as a table upon which is supported a sheet, ribbon or disc of paper or the like. A vibrating member equipped with a marking instrumentality, such as a stylus or the equivalent, is provided to cooperate with said sheet. Thus, upon rotation of the table and actuation of the vibrating member, a wavy line or curve is traced on the paper. A rotatable shaft carries a knife which is arranged to make a cut in the edge of the paper at each rotation of the shaft. The shaft is rotated by means of a weight which is connected with a drum on the shaft by means of a cord having a portion wound about the drum. When the weight is permitted to fall, the cord is drawn off the drum and thus causes its rotation. Simultaneous rotation of the table and the drum causes the stylus to draw a curve adjacent the edge of the disc and the knife to make cuts on the edge of the discs at intervals, the distances between the cuts being dependent upon the rotational speed of the shaft which in turn is dependent upon the speed at which the weight is dropping. Each complete rotation of the drum corresponds to a drop in the weight of a definite predetermined distance, but, as the velocity of the weight increases with the distance traversed, the distance between the cuts steadily decreases. By knowing the rotational speed of the table and the period of the vibrating member, the time taken for the weight to drop through a given distance may be determined and a student or investigator may determine experimentally the laws of falling bodies.

Other objects, novel features and advantages of the invention will be apparent from the following specification and accompanying drawings, wherein Figure 1 is a plan view of an apparatus embodying the invention;

Fig. 2 is a side elevation thereof; and

Figs. 3 and 4 are diagrammatic illustrations of modified uses of the apparatus.

Figure 1:
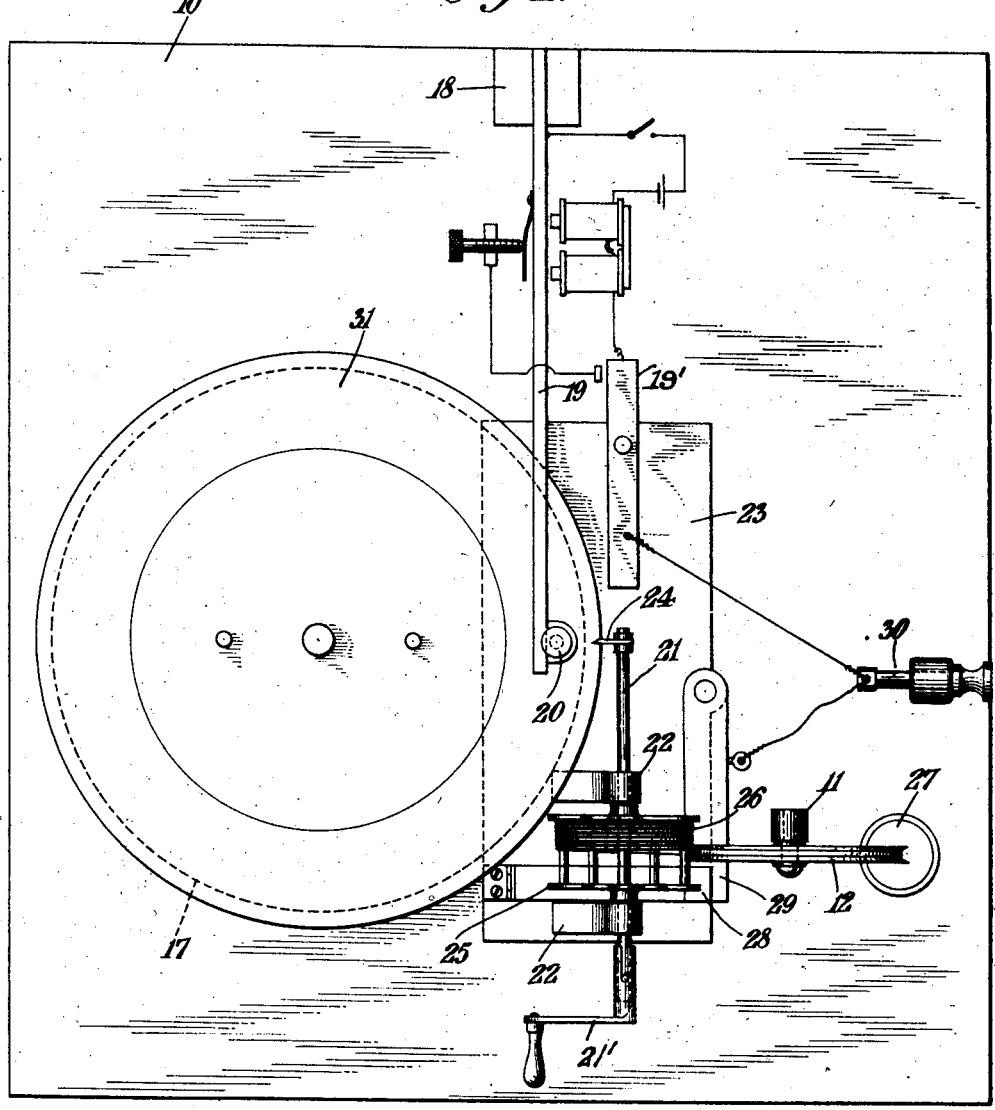

10 designates the base of the apparatus from which projects a pole 11 which may be of any suitable height and at the top of which is provided with a pulley, roller or smooth curved surface 12. A housing 13 is supported by the base 10 and within the housing is arranged a spring motor 14 which drives a shaft 15 mounted on the bearings 16. A table 17 is supported by the upper end of the shaft 15.

A standard 18 is supported by the base 10 and has mounted in its upper end a flexible or vibratory member 19, one end of which projects over the table 17. A stylus 20 or other marking instrumentality is carried by the free end of the vibrating member 19. The member 19 is preferably vibrated electrically as shown in Fig. 1.

A shaft 21 is mounted in supports 22 mounted on the block 23. One end of the shaft 21 terminates adjacent the periphery of the table 17 and carries a knife or other cutting instrumentality 24. A drum or reel 25 is also mounted on the shaft 21. This drum comprises a pair of end plates between which extend a plurality of pins. The drum is extremely light and its moment of inertia is very small. A non-stretchable cord 26 has one end connected to the reel 25 and passes over the element 12 and has a weight 27 connected to its opposite end. A handle 21' is provided for rotating the drum 25 to wind up the cord 26 thereon and thus elevate the weight 27. Rotation of the drum 25 is prevented by a lever 28 which is held in drum-engaging position by a latch 29. The switch 19' controlling the circuit for actuating the vibrating member 19 and the latch 29 are connected by cords or the like with a slide 30, the length of the cords being such that the switch 19' is controlled before the weight 27 is permitted to drop, thus ensuring that the time-indicating apparatus is in operation when the weight starts to fall.

The above-described apparatus is made use of as follows:

Assume that the cord 26 has been wound up on the drum 25 so that the weight 27 is lifted to the position shown in Fig. 2 or even higher. A disc of paper or the like 31 is arranged on the table 17 which is caused to rotate by the spring motor 14, this motor being regulated to rotate the table at a uniform rate. The member 30 is then pulled back, the vibrating member is actuated by its cord and the latch 29 is removed from under the end of the lever 28, allowing the spring 28a to pull the lever 28 out of drum-engaging position. The weight 27 is thus permitted to drop and in so doing causes the rotation of the drum. As the table 17 rotates, the stylus 20 traces a curve on the paper adjacent its periphery and upon each rotation of the drum, the knife 24 cuts a notch in the edge of the paper disc 31. There is thus produced on a single sheet and in substantial parallelism an indication of elapsed time and the distance through which the weight 27 has fallen during that elapsed time. The distance between successive cuts represents a distance equal to one turn of the cord about the drum 25. By reference to the curve and to the cuts, it is possible accurately to calculate the time required for the weight to drop a definite distance and from these figures the laws of falling bodies may be checked.

The pole 11 may be of any suitable height and the weight 27 may be varied as found desirable. Preferably, the pole 11 should be in the neighborhood of several feet in order to permit the weight 27 to travel a substantial distance. This permits the use of the apparatus for lecture-room work. For laboratory work, the pole may be eight feet or even less. The drum 25 and wheel 12 are preferably made of skeleton construction. By using a relatively large weight 27, the percentage error can be made as small as desired.

This apparatus may also be used in other ways. For example, as shown in Fig. 3, a weight 27' of less mass than the weight 27 may be attached to the cord 26. The resultant force is the difference between the weight of the masses 27 and 27', while the mass acted upon by this force is their sum in addition to the effective mass of the drum 25 and pulley 12 which, as above indicated, can be made negligibly small. With this arrangement, additional experiments may be performed to demonstrate the fundamental principle of dynamics that force equals mass times acceleration.

As shown in Fig. 4, the apparatus may also be used to determine the moment of inertia of a rotative body. An additional cord 26' connects the rotative body 32 with the cord 26. The weight 27 is allowed to drop in the same manner and corresponding records obtained. From these records, calculations can be made to determine the moment of inertia of the cylinder 32 and its effective mass at the radius of the cord and thus at any other radius.

By means of the above-described apparatus, substantially parallel records are produced on a single sheet or the like representing the distance traveled by a falling body and the elapsed time. The apparatus is not limited to use in connection with falling bodies, but the cord 26 may be attached to any moving machine member or the like for the purpose of obtaining data concerning its speed or acceleration. The records thus made may be correlated in any suitable manner to permit making the calculations desired. This apparatus gives accurately simultaneous values of a freely falling body and has decided advantages over machines heretofore used such as the Atwood machine. The Atwood machine does not make permanent records, but a student has to estimate the time required for a body to fall a given distance. In addition, by means of this machine, experimental data may be obtained to prove the law that force equals mass times acceleration, which can be done with the Atwood machine but not so accurately. In addition, the entire apparatus with the exception of the pole 11 is compact and may be easily set up wherever desired. The pole is removable and need not be an actual part of the apparatus, the pulley 12 being capable of support in other ways. The vibrating member and stylus may be dispensed with if a governor is provided to insure uniform rotation of the table. In such event, the cuts made by the knife may represent both distance traveled and elapsed time.

It is apparent, of course, that various modifications may be made in the structure of the device without in any way departing from the spirit of the invention as defined in the appended claims. Also the device may be used in other ways than those specifically described.

I claim:

1. In combination, a rotatable table adapted to support a disk of paper or the like, a vibratory marking member supported above said table, means for imparting vibration to said member, means for making indications on the periphery of said disk, said means being operable by a falling weight, means for preventing the operation of said indication marking means, and means operable successively to start the operating means for the vibratory member and to render inoperative said preventing means.

2. In combination, a rotatable table adapted to support a disk of paper or the like, a vibratory marking member supported above said table, means for imparting vibration to said member, a rotating member operable by a falling weight and being adapted to make indications on the periphery of said disk, means for preventing rotation of said last named member, and means operable successively to start the operating means for the vibratory member and to render inoperative said preventing means.

3. In combination, a rotatable table adapted to support a disk of paper or the like, a vibratory marking member supported above said table, means for imparting vibration to said member, a shaft, a cutter carried by said shaft, a drum on said shaft, a cord connected to and wound about said drum, a weight connected to said cord for rotating said drum, means for preventing rotation of said drum, and means operable successively to start the vibratory marking means and to render inoperative said preventing means.

4. In combination, a rotating member for supporting a disk of paper or the like, means operable by a moving body to produce on said disk indicia representing successive equal space intervals traversed by said body, means for preventing operation of said last named means, means for producing indicia representing successive time intervals, means for actuating said last named means, and means for successively starting said actuating means and rendering inoperative said preventing means.

In testimony whereof, I have signed my name to this specification.

PETER L. TEA.